Nov. 5, 1968 J. R. SWEET ET AL 3,409,882

DIGITAL CONCEPT COORDINATION INFORMATION RETRIEVAL SYSTEM

Filed Dec. 29, 1965 4 Sheets-Sheet 1

*INVENTORS*
JAMES R. SWEET
LOUIS D. STEVENS
JACK O. HILDEBRAND

By John L. Jackson
ATTORNEY

Nov. 5, 1968 J. R. SWEET ET AL 3,409,882

DIGITAL CONCEPT COORDINATION INFORMATION RETRIEVAL SYSTEM

Filed Dec. 29, 1965 4 Sheets-Sheet 4

United States Patent Office 3,409,882

Patented Nov. 5, 1968

3,409,882

DIGITAL CONCEPT COORDINATION INFORMATION RETRIEVAL SYSTEM

James R. Sweet and Louis D. Stevens, Saratoga, and Jack O. Hildebrand, San Jose, Calif., assignors to International Business Machines Corporation, Armonk, N.Y., a corporation of New York Filed Dec. 29, 1965, Ser. No. 517,311
8 Claims. (Cl. 340—172.5)

ABSTRACT OF THE DISCLOSURE

A search system in which lengthwise tracks on an endless magnetic belt are assigned to keywords and the positions lengthwise along the tracks correspond to document numbers. If a document contains a keyword, the portion of the keyword track corresponding to that document is saturated in the positive direction. Two buffer tracks may be used during searching in the system. In the conventional concept coordination application a single buffer track is saturated positively at all document bit positions prior to the start of a search. A movable magnetic head is positioned over the first keyword track and the belt rotated past the head and, where no bit is encountered, the corresponding document bit in the buffer track is erased. The movable head is then moved to the next keyword track and the operation repeated. After the appropriate keywords have been searched, the documents containing all of the keywords will be indicated on the buffer track by a positive one bit.

In a second embodiment two buffer tracks are utilized and the AND function implemented with a single buffer track is supplemented by the NOT and OR functions. The NOT function is implemented by a simple inversion, while the OR function is implemented by converting an OR statement into an AND statement through utilization of De Morgan's theorem.

This invention relates to information retrieval in general and more particularly to a retrieval unit wherein an index is stored in concept coordination form on a magnetic media which is searched by means of associated magnetic heads to provide, on an output buffer track, numbers of documents which meet the prescribed search criteria.

The inability to locate published knowledge efficiently is generally felt to be both a decided inconvenience and a serious obstacle to technological advancement in many areas of business, education and government. Engineers, for example, find that not only is it impossible to read every article of interest but that it is nearly as difficult to file important literature for retrieval at a later date even with present day sophisticated filing systems and library techniques. In a recent survey, a large majority of engineering executives questioned cited time lost in retrieving information as the biggest waste of engineering time. Moreover, the real value of information is not measured by the expense of obtaining it, but rather by the cost of not having it when needed.

Conventional classification systems as, for example, those used in libraries, attempt to divide all knowledge into categories and sub-categories which are arranged alphabetically in an index. Personal files have generally been maintained by writing abstracts on reference cards which are filed alphabetically under subject headings. These systems are somewhat restricted; however, since any approach to a reference from more than one avenue of approach requires elaborate cross-referencing and duplication of the entry. The achieving of any satisfactory depth of indexing therefore becomes both time consuming and costly as the size of the file and/or depth of information increases.

Another system, know as "concept coordination," has more recently found wide acceptance. Concept coordination overcomes certain of the limitations of subject classification. In concept coordination, simple descriptive words (keywords) are substituted for the subject categories, thus reducing the number of index terms. Just as all English words can be constructed from twenty-six letters, so an index vocabulary of a few hundred keywords can describe a great many concepts.

One such typical concept coordination system can be briefly described as follows:

An article to be filled is first assigned a unique number without regard to content. The article is then scanned to pick out all of the keywords which describe its subject matter. Each keyword and its document number is entered on a 3 x 5 card. The keyword cards are then placed in a file that is arranged alphabetically, and the original document filed in numerical sequence with all other documents, regardless of content. To retrieve information, the desired keyword cards are picked from the file and compared. The document numbers that show up on all of the selected cards represent the document or documents that contain the information of interest.

The subject invention is based on a concept coordination method of indexing but provides additional desirable search capabilities. Its operation, in the simplest form, is not essentially different from that of a concept coordination system. However, unlike commercially available small indexes, it employs a magnetically recorded keyword file, and electronic search controls for searching. Additionally, the range of search modes is extended to include, not only the conventional concept coordination AND function, but also the OR and NOT functions and any combination thereof. Indexing is accomplished by establishing keyword tracks along the width of an endless belt and utilizing positions along the length of the belt for document numbers. Magnetic bits are then recorded in the keyword tracks at the position corresponding to the document number those keywords describe.

It is an object of the present invention to provide a novel search system.

Another object of the present invention is to provide a new search system utilizing the concept coordination technique of information retrieval.

Another object of the present invention is to provide a new search system utilizing the cincept coordination search mode with the convention AND function and additionally the OR and NOT functions to provide an expanded range of search modes.

Another object of the present invention is to provide a new search system wherein the logical operations for a concept coordination search are performed by selective erasure of a magnetic media.

Another object of the present invention is to provide new search system wherein the logical functions AND, NOT and OR or any combination thereof are performed by selective inversion and selective erasure of a magnetic media.

Other and further objects and advantages of the invention will be apparent from the following more particular description of the preferred embodiment of the invention as illustrated in the accompanying drawings in which.

Briefly, in the preferred embodiment, lengthwise tracks on an endless magnetic media are assigned to various keywords. The positions lengthwise along the tracks correspond to document numbers. If a document contains a keyword, the portion of the keyword track corresponding to that document is saturated in the positive direction. Two buffer tracks are used during searching in the system. In the conventional concept coordination system, buffer track 1 is saturated positively (all ones) at all document bit positions prior to the start of a search. A movable head is positioned over the first keyword track and the magnetic media rotated past the magnetic head, and where no bit is encountered, the corresponding document bit in BT1 is erased while where a bit is encountered, indicating the presence of the keyword in the document, the 1 bit is retained. The movable head is then moved to the next keyword track and the above operation repeated. After the appropriate keywords have been searched, the documents containing all of the keywords will be indicated on buffer track 1 by a positive magnetic saturation of 1 bit.

In the expanded system, the previously described AND function is supplemented by the NOT, and OR functions to provide a more powerful search system which cannot be performed in conventional concept coordination systems. To implement the expanded system, a second or interim buffer track, BT2, is provided. The NOT function is implemented by simple inversion. The OR function is provided by converting an OR statement into an AND statement by the utilization of De Morgan's theorem:

$$A+B=(A'B')'$$

To provide this double inversion, the second buffer track, BT2, is utilized. The first inversion is recorded on BT2 and the second inversion occurs during the transfer of BT2 to BT1.

Figure 1:
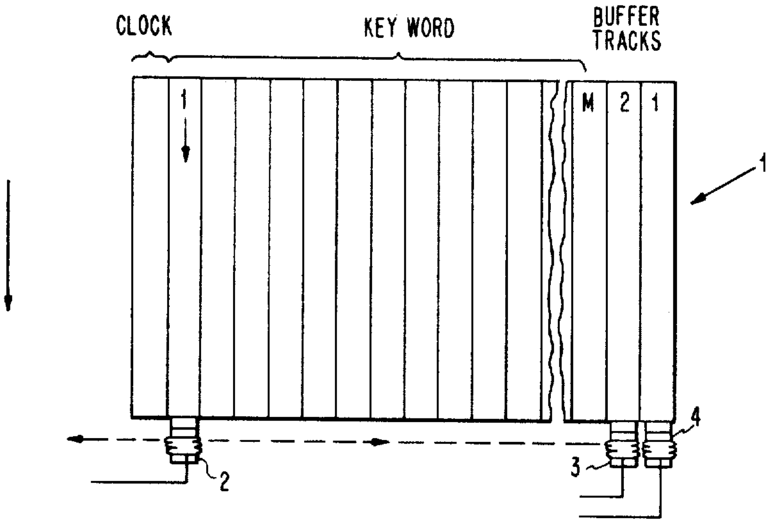
FIG. 1 is a view showing a portion of magnetic belt with a magnetic head movable in operable association with a clock track and keyword tracks and two fixed heads in operable association with two buffer tracks.

For a more detailed description of the subject novel system, refer first to FIG. 1 wherein a magnetic media such as an endless magnetic belt generally designated at 1 is shown in operable association with a movable magnetic head 2 and fixed magnetic heads 3 and 4. The movable magnetic head 2 is movable into operable association with a clock track and the keyword tracks (1–*n*) and the fixed magnetic heads 3 and 4 are in operable association with buffer tracks 1 and 2, respectively.

Figure 2:
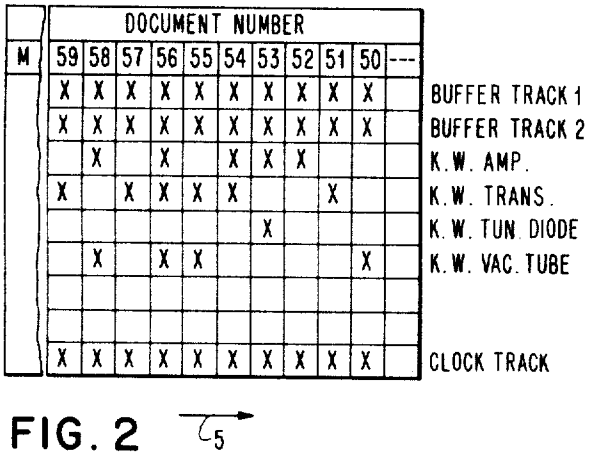
FIG. 2 is a representation of magnetic recording on a magnetic medium such as that of FIG. 1 representing an index with exemplary keywords and documents and the contents of the buffer track prior to the initiation of a search.

In FIGS. 2–7 are shown magnetic patterns on BT1 and BT2 which occur during the search of the magnetic index for the statement "amplifiers or transistors or tunnel diodes and NOT vacuum tubes." As will become more obvious hereinafter, to simplify the operation of the system for unskilled operators, the above statement should preferably be written with the OR portion enclosed in parentheses. Thus, the statement would read: "amplifiers (transistor or tunnel diode) and NOT vacuum tubes." Upon encountering the opening parenthesis, the operator would switch a control switch from the AND or normal position to the OR position and upon encountering the closing parenthesis, would return the switch to the AND position. In FIGS. 2–7, the magnetic belt, containing the magnetic patterns depicted, moves in the direction as indicated by arrow 5 associated with FIG. 2. Refer now more particularly to FIG. 2. In FIG. 2, a portion of an index is provided to facilitate a discussion of the subject novel system. In FIG. 2 are shown document numbers 50–59. Obviously, on the magnetic media, the numbers 50–59 would not be shown and the clock pulses would be run through a counter to provide an indication as to which document is in alignment with the magnetic head scanning the buffer tracks BT1 and BT2. At the start of the search, both BT1 and BT2 contain all 1's. Considering FIG. 2 further, it will be seen that documents 52, 53, 54, 56 anrd 58 contain the keyword "amplifier" while documents 51, 54, 55, 56, 57 and 59 contain the keyword "transistor," etc.

Figure 3:
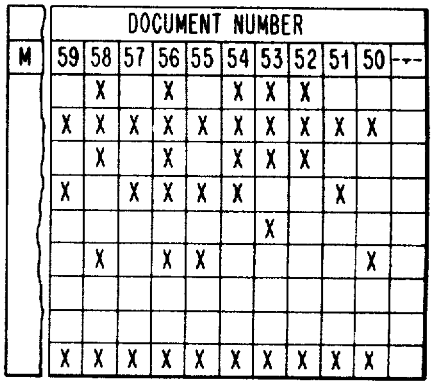
FIG. 3 illustrates the resultant magnetic pattern on buffer track 1 after the magnetic index of FIG. 2 has been searched for the keyword "amplifier"
Figure 4:
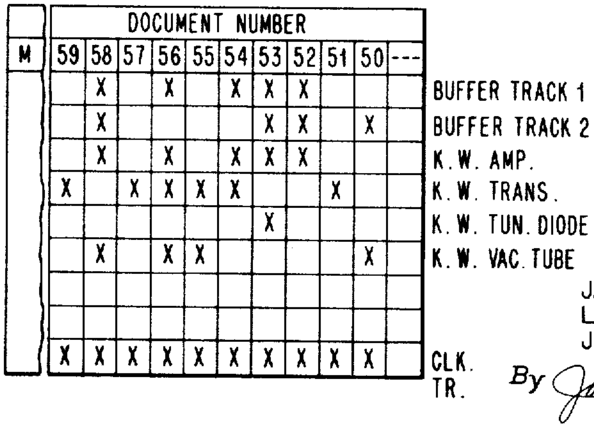
FIG. 4 illustrates the resultant magnetic pattern on buffer track 2 after the magnetic index of FIG. 3 has been searched for "transistor"
Figure 8:
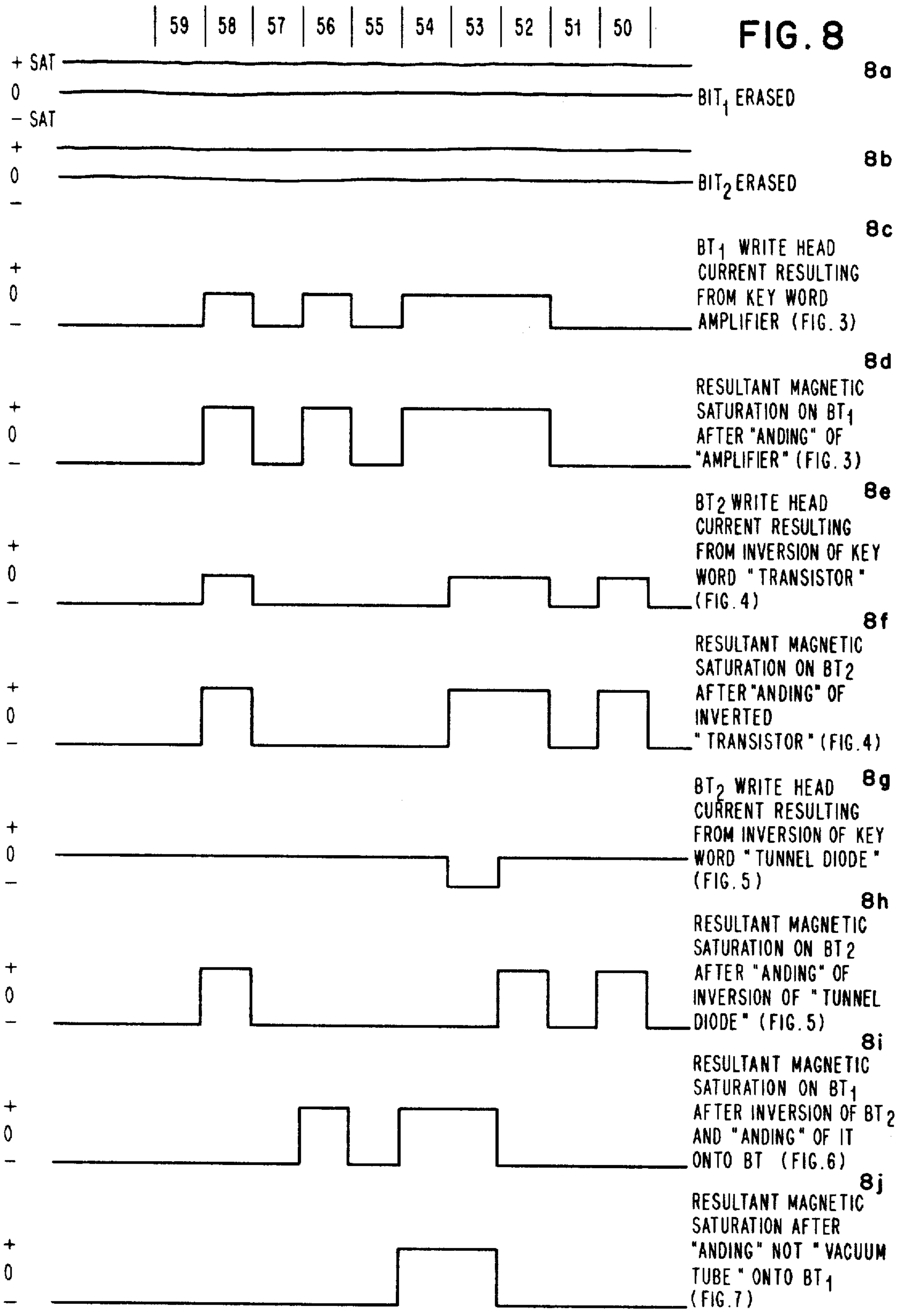
FIG. 8 is a chart showing the current waveforms in the magnetic write heads and saturation of buffer tracks 1 and 2.

A description of the search of the statement "amplifiers, transistors or tunnel diode, and NOT vaccum tube" will be provided. In the following discussion, the current waveforms in the magnetic write heads and magnetic saturation levels plotted in FIG. 8 will facilitate an understanding of the method of selective erasure, inversion and transferring which are utilized to meet the requirements of De Morgan's theorem to provide the OR function as well as the previously described selective erasure to achieve the AND function of the conventional concept coordination search. Referring to FIG. 8C, it will be seen that the BT1 write head current resulting from the search of the keyword "amplifier" is negative in all instances where the keyword is not contained. When a 1 bit is read indicating presence of the keyword in the document, the write head current in BT1 rises to the 0 level. FIG. 8D shows the resultant magnetic saturation on BT1 after the search of the keyword "amplifier." From a consideration of FIG. 3, it will be seen that the resultant magnetic saturation is negative except at document bit positions 52, 53, 54, 56 and 58 which contained the keyword "amplifier." This is shown in FIG. 3. BT2, of course, remains unaffected since no write current was applied to its associated magnetic head. BT1 now contains an indication of those documents which contain the keyword "amplifier." The above method can be repeated to provide a conventional concept coordination search with the selective erasure as previously shown and described. In FIGS. 4 and 8F are shown the results of the search of the term "or tunnel diode."

If:

Amplifier$=A$
Transistor$=X$
Tunnel diode$=T$
Vacuum tube$=V$ the exemplary statement "amplifiers, transistors or tunnel diodes, but not vacuum tubes" can be written as:

$$A\cdot(X+T)\cdot V' \qquad \text{(Equation 1)}$$

Application of De Morgan's theorem yields:

$$A\cdot(X'\cdot T')'\cdot V' \qquad \text{(Equation 2)}$$

From a consideration of Equation 2, it is apparent that to provide an OR function, a double inversion is required. This double inversion is obtained in the subject system wherein the logical functions are performed on the magnetic media by selective erasure, by utilization of an interim buffer track, BT2, onto which the first inversion is recorded and the second inversion then takes place during transfer of the contents of the interim BT2 to BT1.

Figure 5:
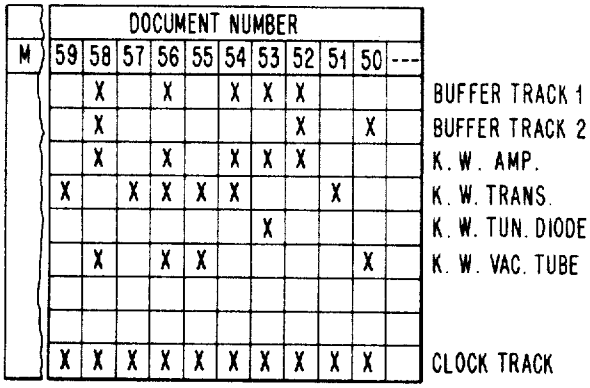
FIG. 5 illustrates the resultant magnetic pattern on buffer track 2 after the magnetic index of FIG. 4 has been searched for "or tunnel diode"
Figure 6:
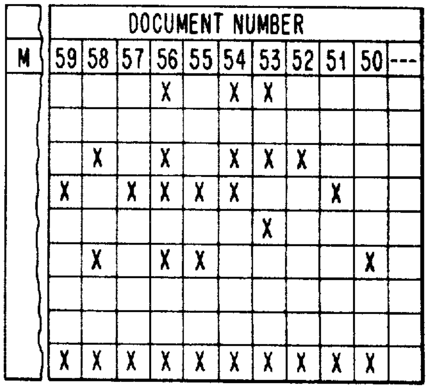
FIG. 6 illustrates the resultant magnetic pattern on buffer track 1 after the contents of buffer track 2 have been transferred to it.

In FIG. 8E is shown the write current resulting from the inversion of the keyword transistor in accordance with Equation 2. From a consideration of FIG. 8E, it will be seen that the current is negative in the BT2 write head in all cases where the keyword "transistor" is present in the index and rises to 0 where the keyword transistor is absent FIG. 8F illustrates the resultant magnetic pattern on BT2 after the ANDing of the inverted keyword "transistor." Documents 50, 52, 53 and 58 remain saturated at the 1 or positive level. Consideration of the index portion of FIG. 4 will show that these documents do not contain the keyword "transistor." Again considering Equation 2, the next step toward completion of the search equation is the AND inversion of tunnel diode onto BT2. This AND inversion is shown in FIGS. 5, 8G and 8H. The index shows that only document 53 contains the keyword "transistor"; therefore, as shown in FIGS. 5, 8G and 8H, to accomplish the inversion, the write head current resulting from the inversion of the keyword "tunnel diode" is 0 for all documents other than document 53 and falls to negative level for document 53.

Figure 7:
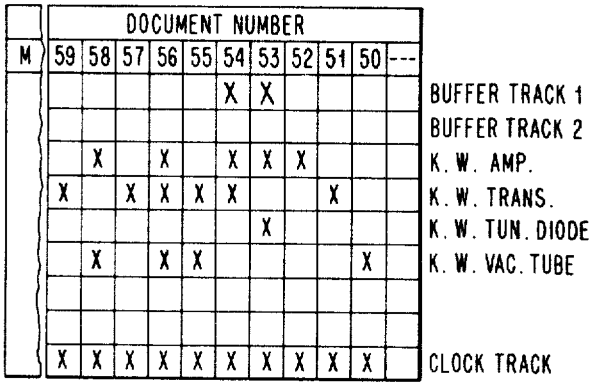
FIG. 7 illustrates the resultant magnetic pattern on buffer track 1 after "not vacuum tube" has been ANDed onto buffer track 1.

FIG. 8–I illustrates the resultant pattern on BT1 after the inversion of the contents of BT2 and the ANDing of them onto BT1. This combining of the magnetic patterns of FIGS. 8H and 8D is illustrated in FIG. 8–I. Only documents 53, 54 and 56 contain a 1 while the remainder of the documents contain a 0. The final portion of the search is illustrated in FIGS. 7 and 8–J with the keyword "vacuum tube" inverted onto BT1. The inversion of the keyword "vacuum tube" results in the erasing of the 1 bit in document 56. Documents 53 and 54 remain saturated at the 1 level. Consideration of the index will show that documents 53 and 54 are in fact the only documents which contain the requisite keywords or negative thereof.

Figure 9:
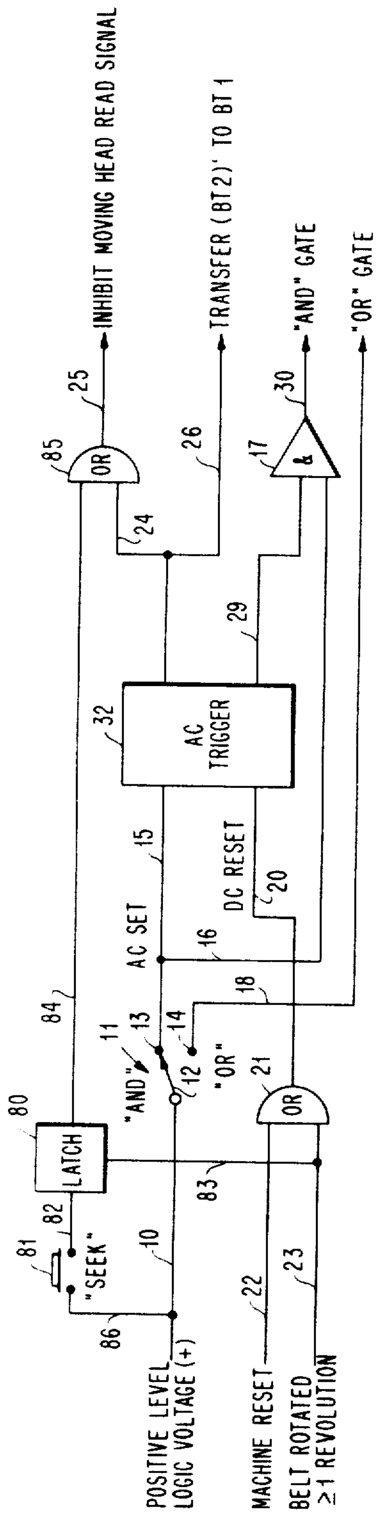
FIG. 9 is a schematic of a system for providing required timing and control signals to the logical system of FIG. 10.
Figure 10:
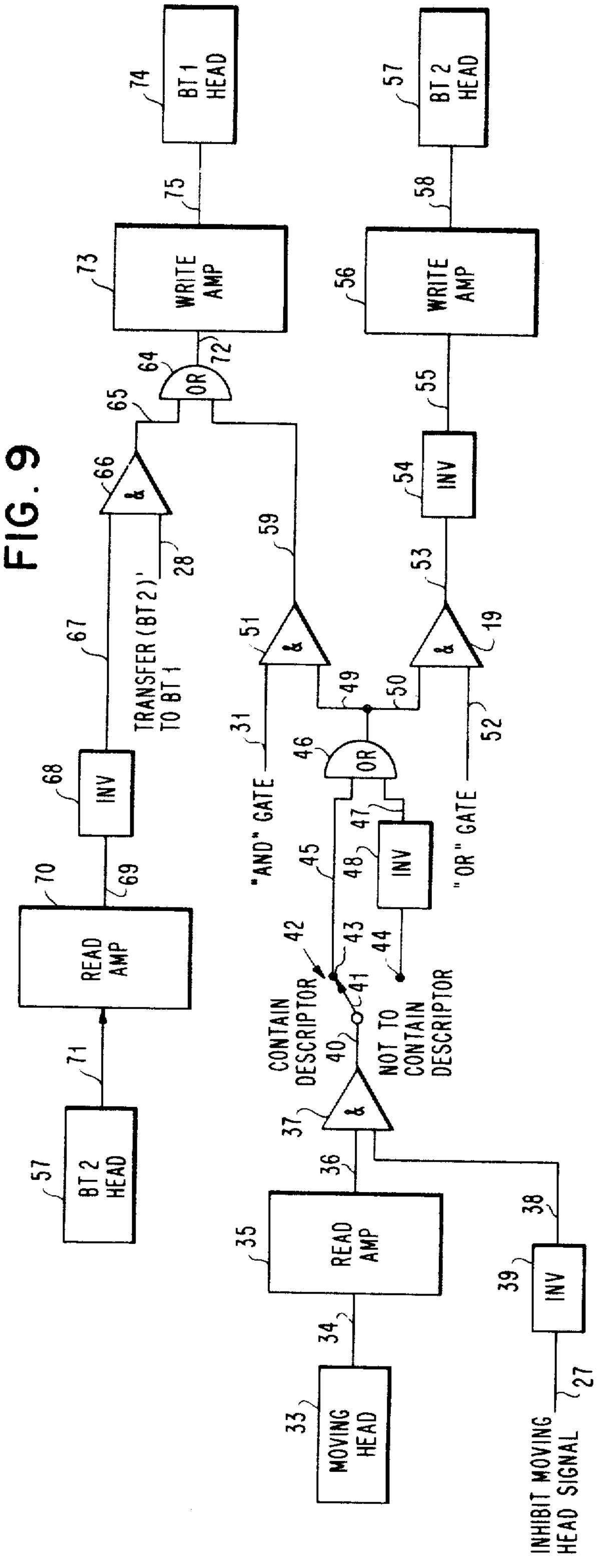
FIG. 10 is a logical system for implementing the AND, NOT, and OR functions required in the subject system.

In FIG. 9 is shown a schematic of a system for providing logical control and timing signals to the logical system of FIG. 10. In FIG. 9, line 10 has applied to it a positive level logic voltage which will hereinafter in the drawings be indicated by a plus. Line 10 is connected to a switch generally designated at 11 which has its movable contact 12 operative between fixed contacts 13 and 14. The fixed contact 13 is designated as the AND contact while the fixed contact 14 is designated as the OR contact. The switch will be mounted on the outside of the machine such that it can be operator set. Contact 13 is connected both along line 15 to an AC trigger 32 and along line 16 to an AND gate 17. The OR contact of switch 11 is connected along line 18, as designated, to the OR gate 19 of FIG. 10. The other input or DC reset to the AC trigger 32 is along line 20 from the OR circuit 21 which in turn has two input terms along lines 22 and 23. Line 22 will have a positive logical level on it when the machine is being reset while line 23 will have a positive logical level on it when the magnetic media has rotated more than one revolution. The machine reset may be obtained from a manually depressible switch or automatic power on signal while the belt rotated more than one revolution signal may be obtained from any appropriate sensing means associated with the belt driving means. Line 24 makes up one input term to the OR circuit 85 which receives a second input along line 84 from latch 80. The upper output of AC trigger 32 is taken along lines 24 and 26. The output of OR circuit 85 is applied to to line 25. Line 25 is the inhibit moving head read control signal line while line 26 is the transfer BT2′ control signal line. The lower output of AC trigger 32 is applied along line 29 to the AND gate 17 and makes up the second term thereof. Lines 24 and 26 are positive and line 29 is negative after line 15 has gone from negative to positive. When line 20 is positive, line 29 is positive and lines 24 and 26 are negative. The output of AND gate 17 is taken along line 30 and applied to line 31 of FIG. 10.

The positive logical level applied to line 10 is also applied along line 86 through a manually depressible "seek" switch 81 to the set input line 82 of the latch 80. The reset line 83 of latch 80 is connected to line 23 which goes positive when the belt has rotated more than one revolution.

To facilitate an understanding of the operation of the system, the logic of FIG. 10 will be described prior to a description of the operation of the control and timing circuits of FIG. 9. The operation of the circuits of FIGS. 9 and 10 will then be described.

In FIG. 10 is shown the logic which operates under control of the control and timing circuits of FIG. 9 to perform the logical AND, NOT and OR functions required in the subject invention. In FIG. 10, a moving head 33 is connected along line 34 to a read amplifier 35 which in turn has its output applied along line 36 to an AND gate 37. AND gate 37 receives another input along line 38 from an inverter 39 which in turn is connected by means of a line 27 to line 25 of FIG. 9. The output of AND gate 37 is applied along line 40 to the moving element 41 of a switch designated generally at 42. The switch 42 is the NOT function switch and the upper fixed contact 43 is the "contain descriptor" contact while the lower fixed contact 44 is the "not to contain descriptor" contact. Again, this switch will be located on the outside of the covers such that it may be operator set. Contact 43 is connected along line 45 to OR circuit 46 which also receives an input along line 47 from an inverter 48 which is connected to the fixed contact 44. The output of the OR circuit is applied along lines 49 and 50 to the AND gates 51 and 19, respectively. Another input term is applied along line 52 to AND gate 19 from line 18 of FIG. 9. The output of AND gate 19 is applied along line 53 through an inverter 54, and along line 55 to a write amplifier 56 which drives the BT2 head 57 along line 58.

As previously discussed, the other input to AND gate 51 is along line 31 from line 30 of FIG. 9. The output of AND gate 51 is applied along line 59 to OR circuit 64. The other input to the OR circuit 64 is along line 65 from AND gate 66 which receives as one of its input terms the signal along line 28 from the AC trigger 32 of FIG. 9. The other input term to AND gate 66 is applied along line 67 from the inverter 68. The input to the invert 68 is along line 69 from the read amplifier 70 which is connected along line 71 to the BT2 head 57.

The output from the OR circuit 64 is applied along line 72 to the write amplifier 73 which drives the BT1 head 74 along line 75.

A description of the performance of a series of logical functions including the AND, the NOT and the OR will be described to facilitate the operational description.

When the machine is turned on, line 22 from the machine reset switch will go positive and reset AC trigger 32 through OR circuit 21 along line 20. To perform a search of a keyword track, switch 81 is depressed such that a positive logical level is applied along line 82 to set latch 80. When latch 80 is set, its output line 84 goes to a negative logical level. This negative logical level is applied to OR circuit 85. The makeup of OR circuit 85 is such that its output will be negative unless one of its input terms from lines 84 or 24 are positive in which case its output will be positive. Thus, as will hereinafter be described, at the start of an AND operation, line 25 from OR circuit 85 will be negative since both of its input terms on lines 24 and 84 are negative. However, after the belt has been rotated more than one revolution, a positive logical level is applied along line 83 to reset latch 80 which causes line 84 to go positive thereby causing line 25 from OR circuit 85 to go positive.

Assume first that switch 11 is in the AND position. The AC trigger 32 which was reset when the machine was turned on will not be set since it can only be set by a positive going transition. AND gate 17 will therefore have both of its input terms positive since both lines 16 and 29 are positive. The positive level from output line 30 of AND gate 17 is applied to line 31 of FIG. 10 to enable AND gate 51. The enabling of AND gate 51 conditions it to pass positive pulses. As moving head 33 receives pulses, they are amplified to the logical level of the system in read amplifier 35 and applied to line 66 which constitutes one input line to AND gate 37. Line 27 is negative at this time since it is connected by means of line 25 to the OR circuit 85. The negative logical level on line 27 is inverted in inverter 39 and appears as a positive logical level on the other input line of AND gate 37. Thus, AND gate 37 is enabled and will pass positive pulses from the moving head 33. The positive pulses from AND gate 37 will either pass through the contain descriptor portion of switch 42 or the not to contain descriptor portion of switch 42. If switch 42 is set, as shown to the contain descriptor position, the positive pulses will pass along line 45 through OR circuit 46, along line 49 to AND gate 51. The pulses will then pass through AND gate 51 since it, as previously described, is enabled by the positive level on its other input line 31. The positive pulses will then pass along line 59 through OR circuit 64, along line 72 into the write amplifier 73. The makeup of the write amplifier 73 is such that the positive pulses turn the amplifier off so that no current is applied along line 75 to the BT1 head 74 while when the level on line 72 to the write amplifier is at the 0 level, the amplifier is on and provides negative drive current to the BT1 head 74. Thus, the previously described selective erasure is accomplished on the BT1 track during the AND function.

The NOT function is provided by switching switch 42 to the not to contain descriptor terminal 44 so that the pulses from the moving head 33 are passed through the inverter 48, along line 47 through OR circuit 46, and as previously described, into the write amplifier 73. This provides the inversion of the positive pulses from the moving head 33.

To accomplish an OR function, switch 11 of FIG. 9 is moved to the OR position such that the positive logical level is applied to terminal 14, along line 18 to line 52 of FIG. 10. This enables AND gate 19. When switch 11 was moved to the OR position, the positive logical level was removed from line 16 so that AND gate 17 is no longer enabled which results in the disenabling of AND gate 51 of FIG. 10. Therefore, no pulse can be applied to the BT1 head 74. The result is that AND gate 19 is enabled while AND gate 51 of FIG. 10 is disenabled. The pulses from moving head 33 pass through AND gate 19, are inverted in inverter 54 and pass into the write amplifier 56. This inversion in inverter 54 provides the first inversion onto the BT2 track in accordance with De Morgan's theorem.

When the OR function is completed, switch 11 of FIG. 9 is again moved to the AND position. When this occurs, AND gate 19 is disenabled since line 18 of FIG. 9 drops. Also, when the positive going waveform which passes along line 10 through switch 11 onto the AC set line 15 reaches the AC trigger 32, the trigger will be set. When the trigger 32 is set, its output lines 24 and 26 will go positive while its reset output line 29 will go negative thereby disenabling AND gate 17 and causing AND gate 51 of FIG. 10 to remain disenabled. Thus, both AND gate 51 and AND gate 19 of FIG. 10 are disenabled such that the moving head pulses are blocked. The positive potential on line 26 of FIG. 9 is, as previously described, applied to line 28 of FIG. 10 to enable AND gate 66. Positive pulses from the BT2 head 57 are passed along line 71, amplified in read amplifier 70 and applied along line 69 to the inverter 68. In inverter 68, the second inversion in accordance with De Morgan's theorem is performed and the inverted pulses from the BT2 read head are passed through AND gate 66 and OR gate 64 and written on the BT1 track by selective erasure as previously described.

Figure 11:
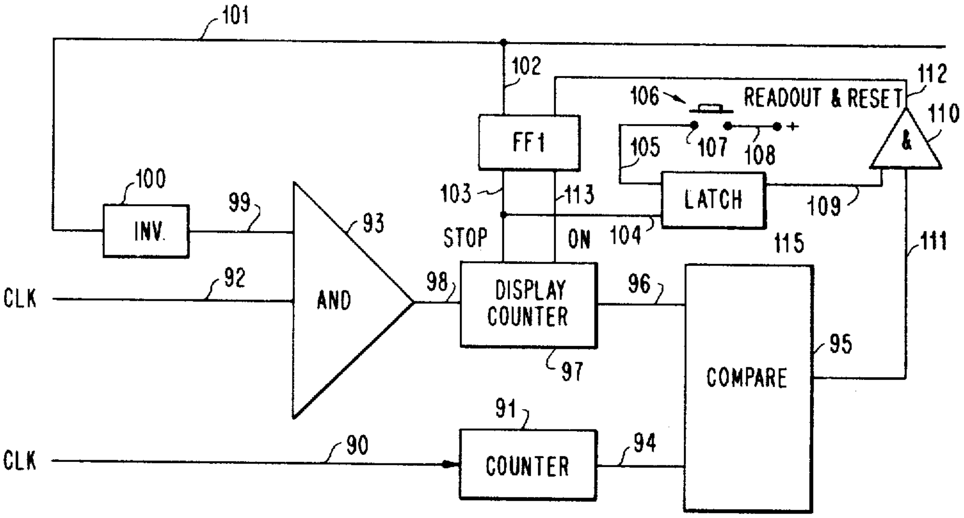
FIG. 11 is a system for displaying search results which are recorded on buffer track 1 at the conclusion of a search.

Refer next to FIG. 11 wherein is shown a diagram of one system for reading out the contents of the BT1 track after a search has been completed. The moving head is positioned in operable association with the clock track.

The clock is applied along line 90 to a counter 91 and along line 92 into the AND gate 93. The output of the counter 91 is applied along line 94 to a compare circuit 95 which also receives an input along line 96 from the display counter 97. The display counter 97 receives input pulses along line 98 from the AND gate 93. Another input to the AND gate 93 is applied along line 99 from the inverter 100 which is connected along line 101 to the BT1 head. The data from the BT1 head is also applied along line 102 to the set terminal of flip flop 1. The set output terminal 103 of FF1 is connected to the display counter inhibit and the reset line 104 of latch 115. The set terminal of latch 115 is connected by means of line 105 to one terminal of a switch generally designated at 106 which is operable upon depressing to connect terminal 107 to a positive logical level along line 108. The output of latch 115 is connected along line 109 to an AND gate 110 which receives another input along line 111 from the compare circuit 95. The output of the AND gate 110 is applied along line 112 to the reset input terminal of FF1. The reset output terminal of FF1 is connected along line 113 to the display counter ON line.

In operation, the data pulses from BT1 are applied along line 101 and pass through the inverter 100 into the AND gate 93. Due to the inversion in inverter 100, the negative pulses representing lack of bits appear as positive pulses at the input of the AND gate 93. Thus, as the positive clock pulses are applied to line 93, AND gate 93 passes a series of positive pulses along line 98 into display counter 97. Display counter 97 will not count until it is turned on. Display counter 97 is turned on at the start of the display and read out operation by the depressing of switch 106 which sets latch 115 thereby placing a positive enabling potential on line 109 into AND gate 110. The counter 91 receives the positive clock pulses along line 90 and counts along until the time that its count equals that of the display counter 97 at which time the compare circuit 95 passes an output pulse along line 111 into AND gate 110. The output of AND gate 110 will then go positive and be operative along line 112 to set FF1 such that the display counter is turned on. The display counter 97 will remain on and will count the clock pulses which are ANDed with the no bit pulses until the first one bit is encountered on BT1. The first one bit will be operative along line 102 to turn FF1 off and therefore stop the counting of display counter 97. The contents of the display counter 97 will thus be the number corresponding to the first bit encountered. To retrieve the next document, the read out and display switch 106 is again depressed and as previously described, when the contents of display counter 97 and counter 91 are equal, the compare circuit 95 will provide an output pulse along line 111 through AND gate 110 to set FF1 such that the display counter is again turned on and the counter will be incremented until the next one bit is encountered on BT1 and then, as previously described, FF1 will be set such that the display counter is stopped. This process is repeated for retrieval of subsequent documents until redundant document numbers are encountered which will indicate that BT1 has been completely read out.

In summary, in the preferred embodiment, lengthwise tracks on an endless magnetic media are assigned to various keywords. The positions lengthwise along the tracks correspond to document numbers. If a document contains a keyword, the portion of the keyword track corresponding to that document is saturated in the positive direction. Two buffer tracks are used during searching in the system. In the conventional concept coordination system, buffer track 1 is saturated positively (all ones) at all document bit positions prior to the start of a search. A movable head is positioned over the first keyword track and the magnetic media rotated past the magnetic head and, where no bit is encountered, the corresponding document bit in BT1 is erased while where a bit is encountered, indicating the presence of the keyword in the document, the 1 bit on BT1 is retained. The movable head is then moved to the next keyword track and the above operation repeated. After the appropriate keywords have been searched, the documents containing all of the keywords will be indicated on buffer track 1 by a positive magnetic saturation or 1 bit.

In the expanded system, the previously described AND function is supplemented by the NOT, and OR functions to provide a more powerful search system which cannot be performed in conventional concept coordination systems. To implement the expanded system, a second or interim buffer track, BT2, is provided. The NOT function is implemented by simple inversion. The OR function is provided by converting an OR statement into and AND statement by utilization of De Morgan's theorem:

$$A+B=(A'B')'$$

To provide this double inversion, the second buffer track, BT2, is utilized. The first inversion is recorded on BT2 and the second inversion occurs during the transfer of BT2 to BT1.

While the invention has been particularly shown and described with reference to a preferred embodiment thereof, it will be understood by those skilled in the art that various changes in the form and details may be made therein without departing from the spirit and scope of the invention.

What is claimed is:

1. A search system comprising:

a recording medium having a plurality of storage areas each with a plurality of storage locations;

one of said storage areas containing data indications at preselected storage locations;

means for sequentially reading the storage locations of said one of said storage areas;

a second of said storage areas containing data indications at each of said storage locations;

means for erasing data indications in said second of said storage areas sequentially in response to the absence of data indications read from said one storage area;

a third of said storage areas containing data indications at preselected storage locations;

means for sequentially reading the storage locations of said third of said storage areas; and means for erasing data indications in said second of said storage areas sequentially in response to the absence of data instructions read from said third of said storage areas.

2. The search system of claim 1 wherein said recording medium is a magnetic member, said storage areas are tracks on said magnetic member, said storage locations are bit positions on said tracks, and said means for reading and erasing are magnetic heads.

3. The search system of claim 2 wherein the reading of said bit positions of said one storage track and the erasing of data indications from said second storage track occurs simultaneously and the reading of the bit positions of said third storage track and the erasing of data indications from said second storage track occurs simultaneously.

4. The search system of claim 1 further including means selectively operable to erase data indications in said second of said storage areas responsive to the presence or absence of data indications in both said one of said storage areas and said third of said storage areas.

5. The search system of claim 1 further including an interim storage area having data indications at each storage location and means selectively operable for erasing data indications on said interim storage area responsive to the lack of data indications on said one of said storage areas and said third of said storage areas and further operable to erase data indications on said second of said storage areas responsive to the lack of data indications on said interim storage area.

6. The search system of claim 4 wherein said recording medium is a magnetic member, said storage areas are tracks on said magnetic member and said storage locations are bit positions on said tracks, and said means for reading and erasing are magnetic heads.

7. The search system of claim 6 further including an interim storage track and means selectively operable for erasing data indications on said interim buffer track responsive to the lack of data indications on said first and third storage tracks and further operable to erase data indications on said second storage track responsive to the lack of data indications on said interim storage track.

8. The search system of claim 7 further including means for identifying which of said bit positions of said second storage track contain data indications at the conclusion of a search.

References Cited

UNITED STATES PATENTS

| | | | |
|---|---|---|---|
| 3,293,619 | 12/1966 | Luhn | 340—172.5 |
| 3,258,754 | 6/1966 | Gabor | 340—174.1 |
| 3,251,046 | 5/1966 | Ragle et al. | 340—174.1 |
| 3,231,869 | 1/1966 | Hill et al. | 340—172.5 |
| 3,219,999 | 11/1965 | Smith | 340—347 |
| 3,214,736 | 10/1965 | Glaser | 340—172.5 |
| 3,183,484 | 5/1965 | Christiansen et al. | 340—146.2 |
| 3,154,771 | 10/1964 | David et al. | 340—174.1 |
| 3,129,321 | 4/1964 | Rogal | 235—61.7 |
| 3,109,162 | 10/1963 | Wolensky | 340—172.5 |
| 3,092,810 | 6/1963 | Schmidt | 340—172.5 |
| 3,066,280 | 11/1962 | Perry | 340—172.5 |
| 3,029,019 | 4/1962 | Dayger et al. | 235—61.6 |

PAUL J. HENON, *Primary Examiner.*

GARETH D. SHAW, *Assistant Examiner.*